United States Patent
Kim et al.

(10) Patent No.: US 6,519,712 B1
(45) Date of Patent: Feb. 11, 2003

(54) INDEPENDENT CHECKPOINTING METHOD USING A MEMORY CHECKPOINT ON A DISTRIBUTED SYSTEM

(75) Inventors: Do Hyung Kim, Taejon (KR); Chang Soon Park, Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 0 days.

(21) Appl. No.: 09/495,587

(22) Filed: Feb. 1, 2000

(30) Foreign Application Priority Data

Oct. 19, 1999 (KR) .......................................... 99-45258

(51) Int. Cl.⁷ ................................................ G06F 11/00
(52) U.S. Cl. ............................. 714/15; 714/16; 714/20; 714/21; 712/228
(58) Field of Search ........................... 714/13, 16, 15, 714/20, 21; 712/228

(56) References Cited

U.S. PATENT DOCUMENTS

| | | | |
|---|---|---|---|
| 5,630,047 A | | 5/1997 | Wang ..................... 395/182.13 |
| 5,802,267 A | * | 9/1998 | Shirakihara et al. .......... 714/15 |
| 5,832,201 A | | 11/1998 | Hirayama et al. ..... 395/182.11 |
| 5,923,832 A | * | 7/1999 | Shirakihara et al. ........ 712/228 |
| 6,332,200 B1 | * | 12/2001 | Meth et al. ................. 707/203 |
| 6,397,352 B1 | * | 5/2002 | Chandrasekaran et al. .. 709/201 |

OTHER PUBLICATIONS

Xu et al., "Adaptive Independent Checkpointing for Reducing Rollback Propagation," in *Proc. of the Fifth IEEE Symp. On Parallel and Distributed Processing*, 1993, pp. 754–761.
Baldoni et al., "An Indexed–based Checkpointing Algorithm for Autonomous Distributed Systems," *IEEE Transactions on Parallel and Distributed Systems*, 10(2):181–192, Feb., 1999.

* cited by examiner

*Primary Examiner*—Scott Baderman
*Assistant Examiner*—Christopher S McCarthy
(74) *Attorney, Agent, or Firm*—SEEP IP Law Group PLLC

(57) ABSTRACT

An independent checkpointing method using a memory checkpoint on a distributed system that includes a message transmission routine, a message processing routine, and a periodical checkpoint routine. The message transmission routine adds a self checkpoint number to a message to be transmitted when a current process tries to send a message to another process. The message processing routine performs a memory checkpoint and processes a message in reference to a checkpoint number of a transmission process, a checkpoint number of the current process, a memory checkpoint flag, and a message transmission flag when a message is received from a process. The periodical checkpoint routine performs a checkpoint that records a necessary state information for recovery against faults periodically in reference to the memory checkpoint flag.

4 Claims, 4 Drawing Sheets

INDEPENDENT CHECKPOINTING METHOD USING A MEMORY CHECKPOINT ON A DISTRIBUTED SYSTEM

TECHNICAL FIELD

The present invention relates to an independent checkpointing method, which recovers problems in running a distributed system and reduces work time. In the method in accordance with an embodiment of the present invention, transmitting processes send messages with a self checkpoint number, and receiving processes determine whether memory checkpoint is to be performed in reference to the transmitting processes' checkpoint number, current process checkpoint number, memory checkpoint flag, and message transmission flag before processing the received message. In performing periodical checkpointings, the method makes reference to the result of the memory checkpoint for checkpointing.

BACKGROUND OF THE INVENTION

Checkpointing technology stores status information of each process and recovers errors by using the stored information when errors occur in running distributed system environments.

Several studies have been done in the area of checkpointing technology. An adaptive checkpointing algorithm was proposed by Jian Xu et al. at Proceedings of Fifth IEEE Symposium on Parallel and Distributed Processing in 1993. The adaptive checkpointing algorithm performs checkpointing by checking whether zigzag cycles made by an input message exist. If input messages make zigzag cycles, the adaptive checkpointing algorithm is based upon the fact that a domino effect may be caused. Therefore, if input messages make zigzag cycles, the adaptive checkpointing algorithm performs checkpointing to remove zigzag cycles before the processing of messages.

A lazy checkpointing algorithm was proposed by Wang et al. at Technical report CRHC-92-27. In the lazy checkpointing algorithm, message transmission processes attach a self checkpointing number to messages to be transmitted, and the message receiving processes compare the checkpointing number of the transmitted messages with their checkpoint number before processing the transmitted messages. If the checkpoint number of the transmission process is larger, checkpointing is performed before the message is processed. At the moment, the checkpoint numbers of the two processes become identical.

However, when the amount of message transmission and execution speed difference increases, these checkpointing methods may cause a large number of checkpoints and increase job completion time.

The number of checkpoints is directly related with job completion time in the error-free environment and the roll back distance is directly related with job completion time in the environment with errors. Therefore, a large number of checkpoints and an increase in roll back distance causes delayed job completion time.

SUMMARY OF THE INVENTION

An independent checkpointing method using memory checkpoint on a distributed system is provided.

The independent checkpointing method in accordance with an embodiment of the present invention includes a message transmission routine, a message processing routine, and a periodical checkpoint routine. The message transmission routine adds a self checkpoint number to a message to be transmitted when a current process tries to send a message to another process. The message processing routine performs a memory checkpoint and processes a message in reference to a checkpoint number of a transmission process, a checkpoint number of the current process, a memory checkpoint flag, and a message transmission flag when a message is received from a process. The periodical checkpoint routine performs a checkpoint that records a necessary state information for recovery against faults periodically in reference to the memory checkpoint flag.

Preferably, the message transmission routine includes the following steps. A step is to generate a message to be transmitted. Another step is to add the checkpoint number of the current process to the message to be transmitted. A further step is to set the message transmission flag true for preparing cases in which an orphan message occurs. An additional step is to transmit the message.

Preferably, the message processing routine includes the following steps. A first step is to receive the message from the process and compare the checkpoint number of the transmission process with the checkpoint number of the current process. Another step is to process the received message if the checkpoint number of the transmission process is smaller than or equal to the checkpoint number of the current process. A further step is to check the memory checkpoint flag if the checkpoint number of the transmission process is larger than the checkpoint number of the current process. Another step is to replace the checkpoint number of the current process with the checkpoint number of the message transmission process and process the received message if the checked memory checkpoint flag is true. A further step is to check the message transmission flag if the checked memory checkpoint flag is false. An additional step is to record the state information of the current process into a memory, set the checkpoint number of the current process as the checkpoint number of message transmission process, set the memory checkpoint flag true, set the message transmission flag false, and process the received message if the checked message transmission flag is true. Another additional step is to replace the checkpoint number of the current process with the checkpoint number of the transmission process and process the received if the checked message transmission flag is false.

Preferably, the periodical checkpoint routine includes the following steps. An initial step is to check the memory checkpoint flag on a periodical checkpoint time. Another step is to record the state information stored at the memory to a disk if the checked memory checkpoint flag is true or recording the state information to a disk and increasing the checkpoint number by one if the checked memory checkpoint flag is false. A further step is to calculate a next periodical checkpoint time. An additional step is to set the memory checkpoint flag and the message transmission flag false.

BRIEF DESCRIPTION OF THE DRAWINGS

The embodiments of the present invention will be explained with reference to the accompanying drawings, in which.

DETAILED DESCRIPTION OF THE INVENTION

The method in accordance with an embodiment of the present invention may be applied to a distributed system, which includes a number of local machines connected through LANs (local area network).

Figure 1:
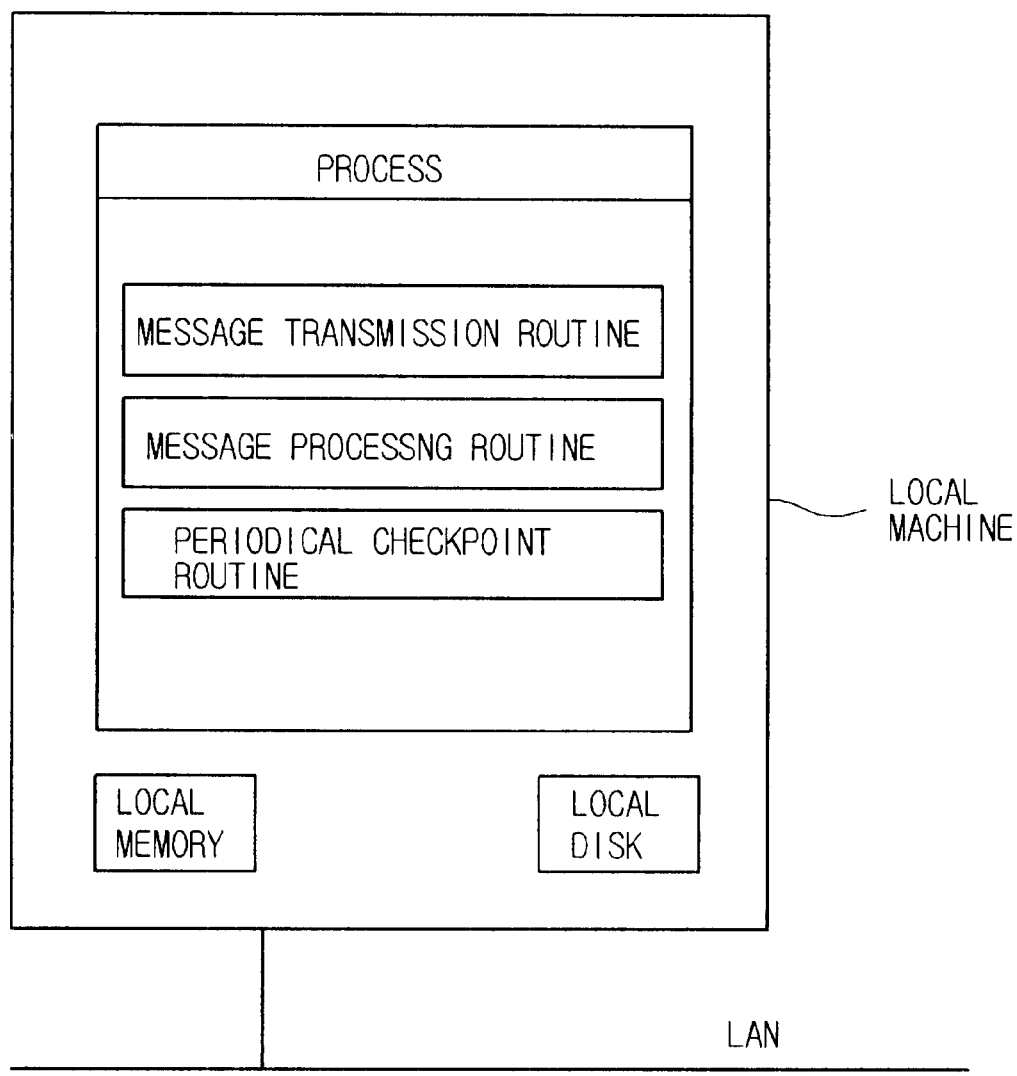
FIG. 1 is a diagram illustrating a process in a distributed system in accordance with an embodiment of the present invention.

FIG. 1 is a diagram illustrating a process in a distributed system in accordance with an embodiment of the present invention. As shown in FIG. 1, a local machine includes local memory and a local disk. A local machine executes a process allocated to a job. Each process includes message transmission routine, message processing routine, and periodical checkpoint routine for recovery against faults. Each process sends information to other processes through messages.

Figure 2:
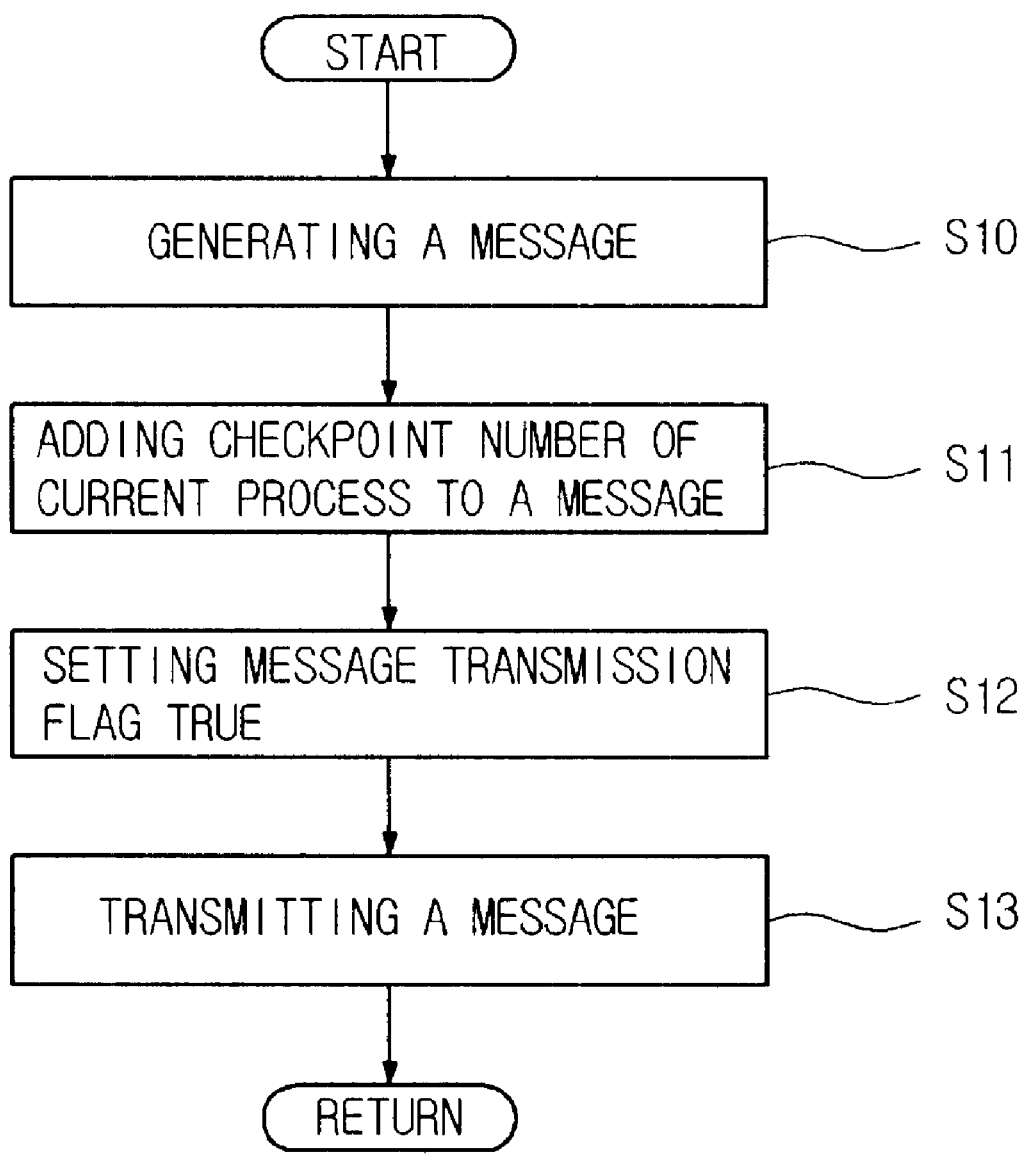
FIG. 2 is a flow diagram illustrating a message transmission routine in accordance with an embodiment of the present invention.

FIG. 2 is a flow diagram illustrating a message transmission routine in accordance with an embodiment of the present invention. As shown in FIG. 2, the independent checkpointing method includes four steps. A first step is to generate a message to be transmitted. A second step is to attach checkpoint number of current process to the message. A third step is to set transmission flag true for processing orphan messages. A fourth step is to transmit the message.

When the current process is running and a new message needs to be transmitted to a different process running in a different local machine, a message that needs to be transmitted earlier is generated at step S10.

Then, a checkpoint number of the current process is added to the generated message to be transmitted at step S11.

Executing a periodical checkpoint routine that is to be described later may increase the checkpoint number of the current process. When a message arrives from other processes, the checkpoint number of the current process may be replaced by the checkpoint number of the transmission process.

After the checkpoint number is added to the message to be transmitted, the message transmission flag is set true for notifying that the current process has sent a message to another process and then the message is transmitted at step S12 and S13.

The message transmission flag is important because it is necessary to reduce the number of the memory checkpoint when orphan messages are generated. Orphan messages are the messages transmitted after the checkpoint of the message transmission processes and received before the checkpoint of the message receiving processes. When errors occur in the message transmission processes, orphan messages bring back the message receiving processes to the point before the checkpoints. Therefore, in order to avoid generating orphan messages, checkpointing is performed after the message transmission processes send a message.

The method in accordance with an embodiment of the present invention employs message transmission flags to reduce the number of memory checkpoints in overall execution of each process and to prevent orphan messages. That is, memory checkpoint is performed only if the checkpoint number of the message transmission process is larger than checkpoint number of the message receiving process and the current message transmission flag of the message receiving process is true.

Figure 3:
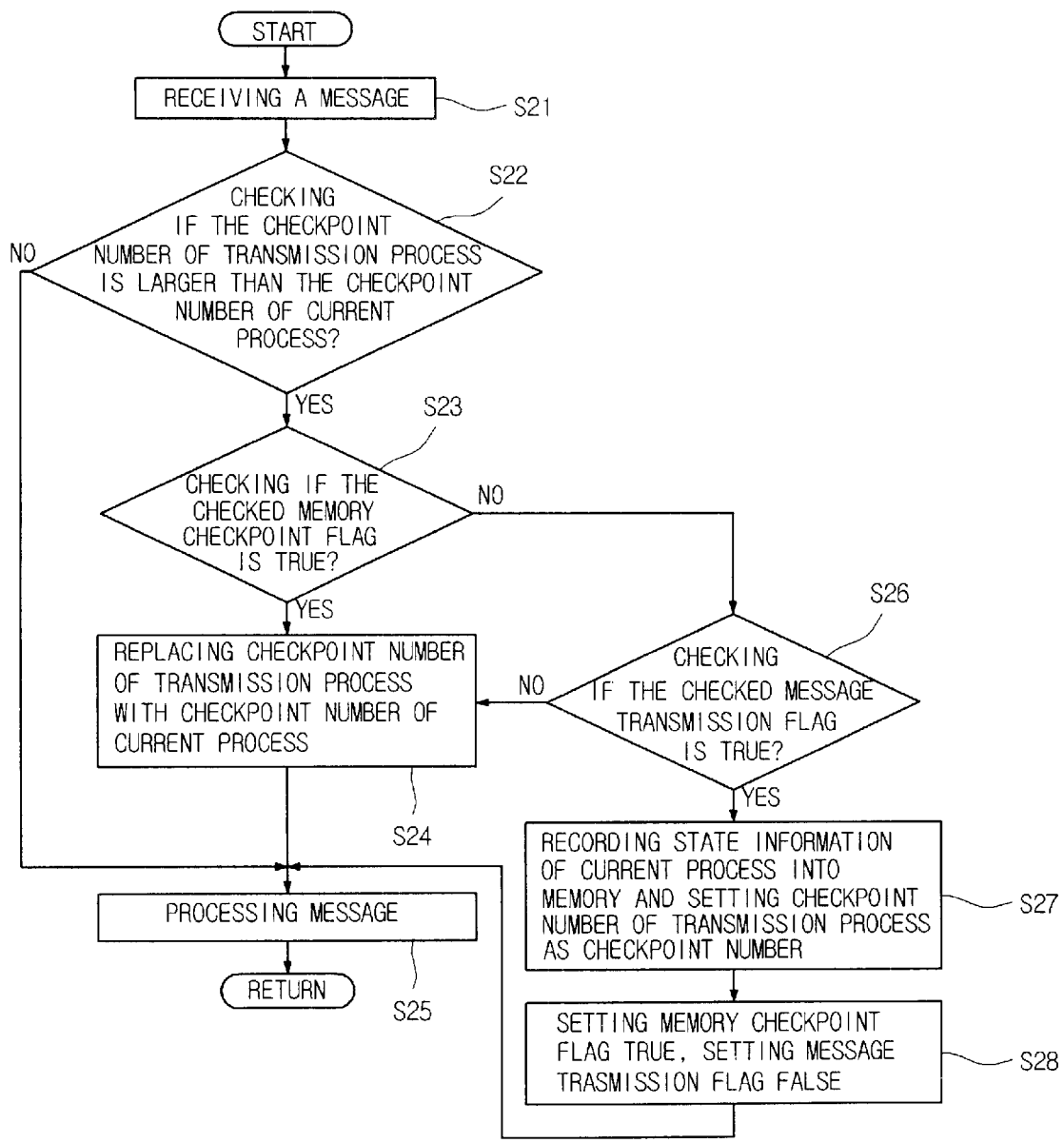
FIG. 3 is a flow diagram illustrating a message processing routine in accordance with an embodiment of the present invention.

FIG. 3 is a flow diagram illustrating a message processing routine in accordance with an embodiment of the present invention.

As shown in FIG. 3, the message processing routine includes the following seven steps. A first step is to receive a message from a process and compare a checkpoint number of the message transmission process with a checkpoint number of the current process. A second step is to process the received message if the checkpoint number of the message transmission process is smaller than or equal to the checkpoint number of the current process. A third step is to check a memory checkpoint flag if the checkpoint number of the message transmission process is larger than the checkpoint number of the current process. A fourth step is to replace the checkpoint number of the current process with the checkpoint number of the message transmission process and process the received message if the memory checkpoint flag checked is true. A fifth step is to check the message transmission flag if the memory checkpoint flag checked is false. A sixth step is to record state information of the current process into memory, set the checkpoint number of the current process as a checkpoint number of message transmission process, set the memory checkpoint flag true, set the message transmission flag false, and process the received message if the message transmission flag checked is true. A seventh step is to replace the checkpoint number of the current process with a checkpoint number of the message transmission process and process the received message if the message transmission flag checked is false.

When a message is received from other processes, the message processing routine compares the checkpoint number of the current process with the checkpoint number of the message transmission process that is added to the message before processing the received message at step S21 and S22.

If the checkpoint number of the message transmission process is smaller than or equal to the checkpoint number of the current process, it means that the processing speed of the message transmission process is slower than or equal to the processing speed of the current process. In such cases, since the memory checkpoint of the current process is not necessary, the current process treats the received message without performing the memory checkpoint at step S25.

However, if the checkpoint number of the message transmission process is larger than the checkpoint number of the current process, it means that the processing speed of the message transmission process is faster than the processing speed of the current process. That is, the current process determines whether the memory checkpoint is to be performed before processing the received message.

The memory checkpoint is performed only if the checkpoint number of the message transmission process is larger than the checkpoint number of the current process, the memory checkpoint has not been performed, and the memory checkpoint after transmitting a message to other processes and periodical checkpoint have not been performed. It reduces number of checkpoints by preventing repetition of memory checkpoints and therefore reduces job completion time, even if a number of messages are received from other processes before the periodical checkpoint is performed.

For this purpose, the memory checkpoint flag is checked to see whether the memory checkpoint has been performed before at step S23.

If the flag is true, which means the memory checkpoint was performed after the periodical checkpoint is performed, the memory checkpoint is not to be performed. Instead, the checkpoint number of the current process is replaced by a checkpoint number of the message transmission process and then a next message is processed at steps S24 and S25.

If the flag is false at step S23, the message transmission flag is confirmed at step S26.

The message transmission flag is a flag describing if the current process has sent any messages to other processes. The message transmission flag is set as true by the message transmission routine and as false after the memory checkpoint or periodical checkpoint is performed.

Therefore, if the message transmission flag is true, which means that the result of the step S26 is true, that is, memory checkpoint or periodical checkpoint is not performed yet, the memory checkpoint that stores the state information of the current process into the memory is performed. Checkpoint numbers become identical by replacing checkpoint number by checkpoint number of message transmission process at step S27.

Then, the memory checkpoint flag is set true and the message transmission flag value is set false at steps S28 and S25 before the next message is processed.

Figure 4:
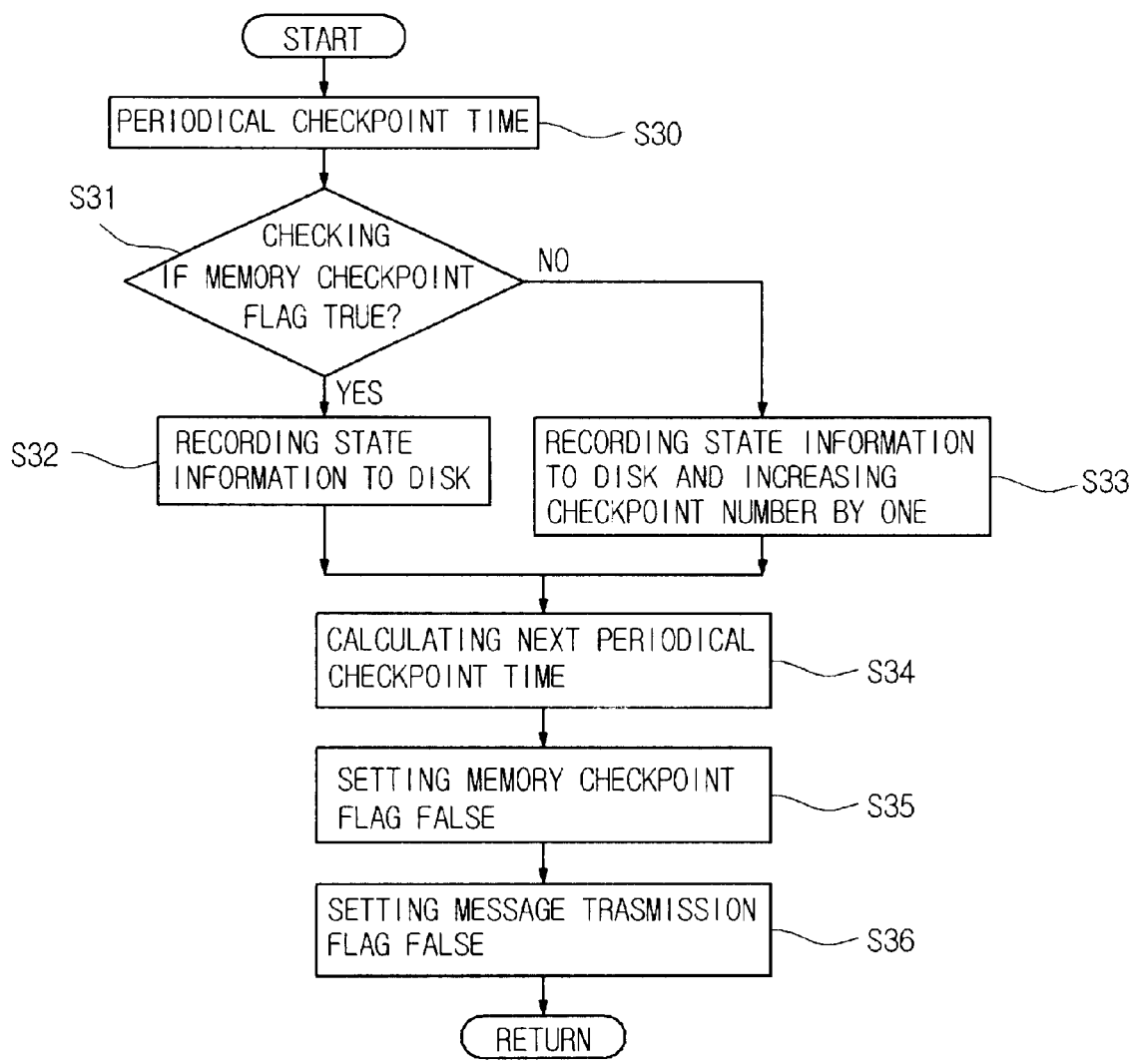
FIG. 4 is a flow diagram illustrating a periodical check-pointing routine in accordance with an embodiment of the present invention.

FIG. 4 is a flow diagram illustrating a periodical checkpointing routine in accordance with an embodiment of the present invention. As shown in FIG. 4, the periodical checkpointing routine includes the following steps. A first step is to check the memory checkpoint flag on periodical checkpoint time. A second step is to record process state information stored at memory to disk if the memory checkpoint flag checked is true or recording process state information to disk and increasing the checkpoint number by one if the memory checkpoint flag checked is false. A third step is to calculate a next periodical checkpoint time. A fourth step is to set the memory checkpoint flag and the message transmission flag false.

The periodical checkpoint routine checks whether the memory checkpoint flag is true or false before writing current state information of the process with a certain period at steps S31 and S32.

The memory checkpoint flag is a flag indicating the memory checkpoint has been performed in the message processing routine. If the memory checkpoint flag is true, which means the memory checkpoint has been performed recently, the process state information stored in memory is written to the disk without increasing the checkpoint number at step S32.

If the memory checkpoint flag is false, which means the memory checkpoint has not been performed recently, the process state information is written on the disk while increasing the checkpoint number by 1 at step S33.

Then, the amount of time for executing the periodical checkpoint is calculated and the memory checkpoint flag and message transmission flag are set as false at steps S34 through S36.

When the amount of message transmission and execution speed difference increase, conventional checkpointing methods cause a large number of checkpoints, which increases delay caused by checkpoints and eventually causes increased job completion time.

However, the method in accordance with an embodiment of the present invention only performs checkpoint on the memory when a message is initially received from a process with a larger checkpoint number. Later, the method increases only the checkpoint number without performing any checkpoints. As shown in FIG. 4, process state information stored in the memory is recorded to disks in periodical checkpoints.

That is, process state information is recorded to disks with a certain period. Even though memory checkpoint is caused in every period, the time for memory checkpoint is substantially smaller than the time for the disk checkpoint, which means that actual job delay time is trivial.

On the contrary, to the conventional checkpoint methods, the method in accordance with an embodiment of the present invention performs only one disk checkpoint with a certain period.

In addition, as shown in FIG. 3, the method in accordance with an embodiment of the present invention removes dependent relations between processes that are usually caused by message transmissions by comparing checkpoint numbers. That is, when a process receives a message with a larger checkpoint number than the process, the process performs the memory checkpoint before processing the message and identifies a checkpoint number with the transmission process. This procedure virtually removes difference of execution speeds and reduces dependent relations between processes. As a result, the method in accordance with an embodiment of the present invention has a short roll back distance when errors occur.

As described above, the method of the present invention adds a checkpoint number in transmitting messages between processes. When a checkpoint number of message transmission process is larger than a checkpoint number of a current process, the method of the present invention performs the memory checkpoint in reference to a memory checkpoint flag and message transmission flag, replaces the checkpoint number of the current process with a checkpoint number of the message transmission process. In addition, the method of the present invention uses the result of the memory checkpoint in performing a periodical checkpoint.

Therefore, when a number of processes perform the same jobs in a distributed system environment, the method in accordance of an embodiment of the present invention has minimum number of checkpoints regardless of the amount of message transmission and execution speed difference. Also, the method removes dependent relations between processes that are usually caused by message transmissions by comparing checkpoint numbers. The method in accordance with an embodiment of the present invention has a short roll back distance when errors occur. Consequently, the method is effective for completing jobs in a minimum amount of time in a distributed system environment with errors or in a distributed system environment without errors.

Although representative embodiments of the present invention have been disclosed for illustrative purpose, those who are skilled in the art will appreciate that various modifications, additions and substitutions are possible without departing from the scope and spirit of the present invention as defined in the accompanying claims and in equivalents thereof.

What we claim:

1. An independent checkpointing method using a memory checkpoint on a distributed system, comprising:
   a message transmission routine for adding a self checkpoint number to a message to be transmitted when a current process tries to send a message to another process;
   a message processing routine for performing a memory checkpoint and processing a message in reference to a checkpoint number of a transmission process, a checkpoint number of the current process, a memory checkpoint flag, and a message transmission flag when a message is received from a process; and a periodical checkpoint routine for performing a checkpoint that records a necessary state information for recovery against faults periodically in reference to the memory checkpoint flag.

2. The independent checkpointing method of claim 1, wherein the message transmission routine comprises the steps of:

generating the message to be transmitted;

adding the checkpoint number of the current process to the message;

setting the message transmission flag to true for preparing cases in which an orphan message occurs; and transmitting the message.

3. The independent checkpointing method of claim 1, wherein the message processing routine comprises the steps of:

receiving the message from the process and comparing the checkpoint number of the transmission process with the checkpoint number of the current process;

processing the received message if the checkpoint number of the transmission process is smaller than or equal to the checkpoint number of the current process;

checking the memory checkpoint flag if the checkpoint number of the transmission process is larger than the checkpoint number of the current process;

replacing the checkpoint number of the current process with the checkpoint number of the message transmission process and processing the received message if the checked memory checkpoint flag is true;

checking the message transmission flag if the checked memory checkpoint flag is false;

recording the state information of the current process into a memory, setting the checkpoint number of the current process as the checkpoint number of message transmission process, setting the memory checkpoint flag true, setting the message transmission flag false, and processing the received message if the checked message transmission flag is true; and replacing the checkpoint number of the current process with the checkpoint number of the message transmission process and processing the received message if the checked message transmission flag is false.

4. The independent checkpointing method of claim 3, wherein the periodical checkpoint routine comprises the steps of:

checking the memory checkpoint flag on a periodical checkpoint time;

recording the state information stored in the memory to a disk if the checked memory checkpoint flag is true or recording the state information to a disk and increasing the checkpoint number by one if the checked memory checkpoint flag is false;

calculating a next periodical checkpoint time; and setting the memory checkpoint flag and the message transmission flag false.

* * * * *